United States Patent
Sanders

(10) Patent No.: US 9,892,839 B2
(45) Date of Patent: Feb. 13, 2018

(54) APPARATUS AND METHOD FOR MAGNETICALLY UNLOADING A ROTOR BEARING

(71) Applicant: Amber Kinetics, Inc., Fremont, CA (US)

(72) Inventor: Seth Robert Sanders, Berkeley, CA (US)

(73) Assignee: Amber Kinetics, Inc., Union City, CA (US)

( * ) Notice: Subject to any disclaimer, the term of this patent is extended or adjusted under 35 U.S.C. 154(b) by 333 days.

(21) Appl. No.: 13/973,937

(22) Filed: Aug. 22, 2013

(65) Prior Publication Data

US 2014/0055905 A1 Feb. 27, 2014

Related U.S. Application Data

(60) Provisional application No. 61/692,631, filed on Aug. 23, 2012.

(51) Int. Cl.
*H02K 7/02* (2006.01)
*H02K 7/09* (2006.01)
(Continued)

(52) U.S. Cl.
CPC .......... *H01F 7/206* (2013.01); *F16C 19/522* (2013.01); *F16C 19/547* (2013.01); *F16C 32/0444* (2013.01); *F16C 39/06* (2013.01); *H02K 7/02* (2013.01); *H02K 7/025* (2013.01); *F16C 19/163* (2013.01); *F16C 32/044* (2013.01);
(Continued)

(58) Field of Classification Search
CPC .......... H01F 7/206; H01F 7/20; H01F 7/0236; F16C 19/163; F16C 19/522; F16C 39/06; F16C 39/063; F16C 2361/55; F16C 32/0406; F16C 32/044; F16C 32/0444;
(Continued)

(56) References Cited

U.S. PATENT DOCUMENTS 3,447,239 A 6/1969 Slick
5,302,874 A 4/1994 Pinkerton
(Continued)

FOREIGN PATENT DOCUMENTS

CN 101127465 A 2/2008
CN 201570937 U 9/2010
(Continued)

OTHER PUBLICATIONS

JP 59019714 English Translation (Abstract).*
(Continued)

*Primary Examiner* — Joshua Benitez-Rosario
*Assistant Examiner* — Alexander Moraza
(74) *Attorney, Agent, or Firm* — Fenwick & West LLP

(57) ABSTRACT

An apparatus and method for unloading a rotor bearing is described. The apparatus includes an electromagnet for levitating the rotor. In one embodiment, a sensor of the magnetic field near the electromagnet is used to control the current to levitate the rotor. In another embodiment, a method is provided that includes rotating the rotor, increasing the current to levitate the rotor and decrease the gap between electromagnet and rotor, and then reducing the current to levitate the rotor with a minimal amount of electric power to the electromagnet.

22 Claims, 11 Drawing Sheets

(51) Int. Cl.
| | |
|---|---|
| *F16C 32/04* | (2006.01) |
| *F16C 39/06* | (2006.01) |
| *H01F 7/20* | (2006.01) |
| *F16C 19/52* | (2006.01) |
| *F16C 19/54* | (2006.01) |
| *H01F 7/02* | (2006.01) |
| *F16C 19/16* | (2006.01) |

(52) U.S. Cl.
CPC ...... *F16C 32/0406* (2013.01); *F16C 32/0451* (2013.01); *F16C 32/0459* (2013.01); *F16C 2361/55* (2013.01); *H01F 7/0236* (2013.01); *H02K 7/09* (2013.01)

(58) Field of Classification Search
CPC ... F16C 32/0451; F16C 32/0459; H02K 7/02; H02K 7/025; H02K 7/09
USPC ........ 310/90.5, 74; 361/144; 74/5.95, 433.5, 74/572.1, 572.2, 572.11, 574.1; 318/161, 318/162, 150
See application file for complete search history.

(56) References Cited

U.S. PATENT DOCUMENTS

| | | | |
|---|---|---|---|
| 5,345,128 A | | 9/1994 | Pinkerton et al. |
| 5,471,105 A | | 11/1995 | Clifton et al. |
| 5,572,079 A | | 11/1996 | Pinkerton |
| 5,731,645 A | | 3/1998 | Clifton et al. |
| 5,747,907 A | | 5/1998 | Miller |
| 5,760,510 A | | 6/1998 | Nomura et al. |
| 5,929,548 A | | 7/1999 | Pinkerton et al. |
| 5,998,899 A | | 12/1999 | Rosen et al. |
| 6,118,202 A | | 9/2000 | Pinkerton |
| 6,124,702 A | | 9/2000 | Pinkerton et al. |
| 6,262,505 B1 | | 7/2001 | Hockney et al. |
| 6,606,536 B1 | | 8/2003 | Aso |
| 6,630,761 B1 | | 10/2003 | Gabrys |
| 6,707,187 B1 | | 3/2004 | Gabrys |
| 6,710,489 B1 | * | 3/2004 | Gabrys ................. F16C 32/044 310/74 |
| 6,794,776 B1 | * | 9/2004 | Gabrys ................. H02K 7/025 310/209 |
| 7,240,583 B2 | | 7/2007 | Wingett et al. |
| 7,400,052 B1 | | 7/2008 | Badger |
| 7,425,807 B1 | | 9/2008 | Perkins et al. |
| 7,642,664 B1 | | 1/2010 | Andrews et al. |
| 7,750,518 B1 | | 7/2010 | Perkins |
| 2007/0263337 A1 | * | 11/2007 | Bataille .................. H01H 47/22 361/160 |
| 2008/0315696 A1 | | 12/2008 | Wang |
| 2009/0096302 A1 | * | 4/2009 | Barada ............... F16C 32/0457 310/90.5 |
| 2010/0156219 A1 | | 6/2010 | Wang |
| 2010/0283340 A1 | | 11/2010 | Fradella |

FOREIGN PATENT DOCUMENTS

| | | | |
|---|---|---|---|
| CN | 202167937 U | | 3/2012 |
| EP | 0632209 A1 | | 1/1995 |
| JP | 59019714 A | * | 2/1984 |
| JP | 04341424 A | * | 11/1992 |
| JP | 09-308185 A | | 11/1997 |
| JP | 200240649 | | 2/2002 |
| JP | 2004-232738 A | | 8/2004 |
| JP | 2004-286175 A | | 10/2004 |
| JP | 2004-286176 A | | 10/2004 |
| JP | 06229419 | | 8/2006 |
| JP | 08028562 | | 2/2008 |
| JP | 2010-001897 | | 1/2010 |
| JP | 2010530516 | | 9/2010 |
| JP | 4746619 | | 8/2011 |
| WO | WO 2007111032 A1 | * | 10/2007 ............ F16C 25/083 |
| WO | WO 2008/156836 A2 | | 12/2008 |
| WO | WO 2008156836 A2 | * | 12/2008 .......... F16C 32/0459 |

OTHER PUBLICATIONS

JP 04341424 English Translation (Abstract).*
WO2007111032A1 (English Abstract).*
International Search Report and Written Opinion of PCT/US2013/056283, dated Oct. 24, 2010.
Supplementary European Search Report for European Patent Application No. EP 13830260, dated Feb. 25, 2016, 10 Pages.
Office Action for Canadian Patent Application No. CA 2,882,798, dated Jan. 8, 2016, 4 Pages.
Office Action for Canadian Patent Application No. CA 2,882,798, dated Aug. 11, 2016, 7 Pages.
Office Action for Chinese Patent Application No. CN 201380055618.1, dated Dec. 30, 2015, 17 Pages.
Office Action for Korean Patent Application No. KR 10-2015-7007329, dated Mar. 20, 2017, 14 Pages.

* cited by examiner

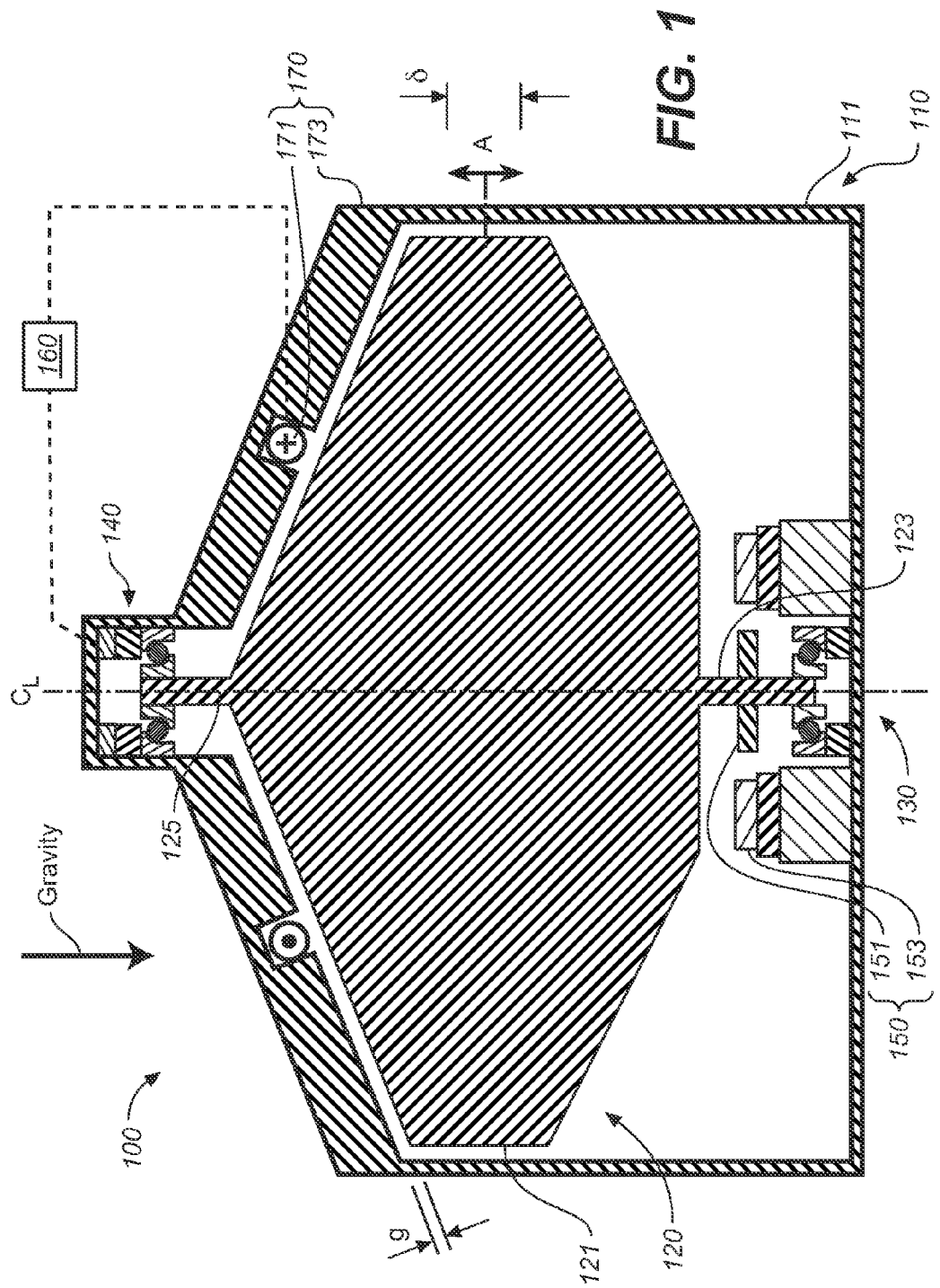

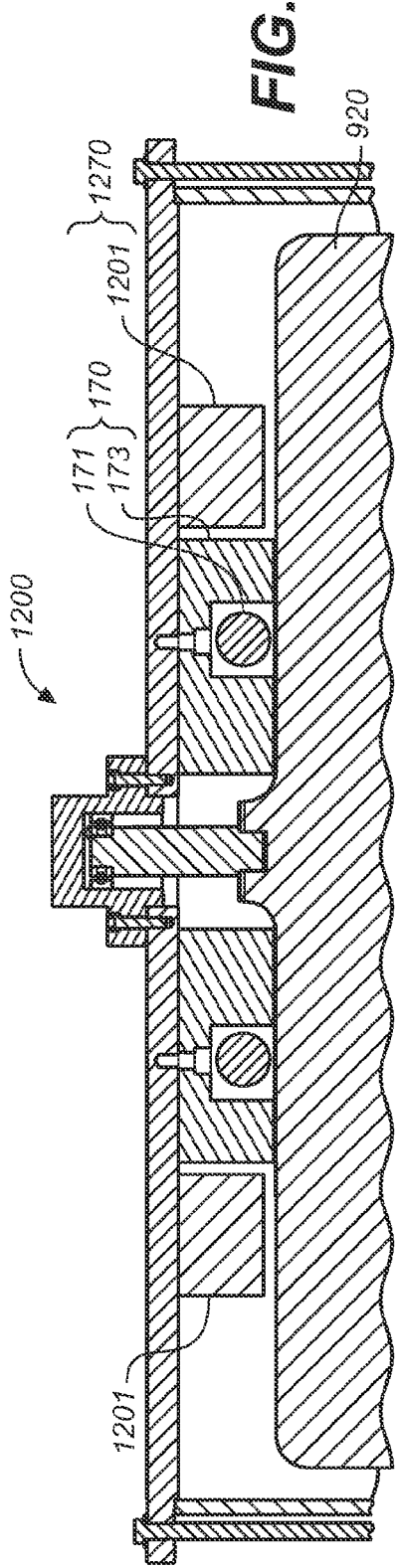
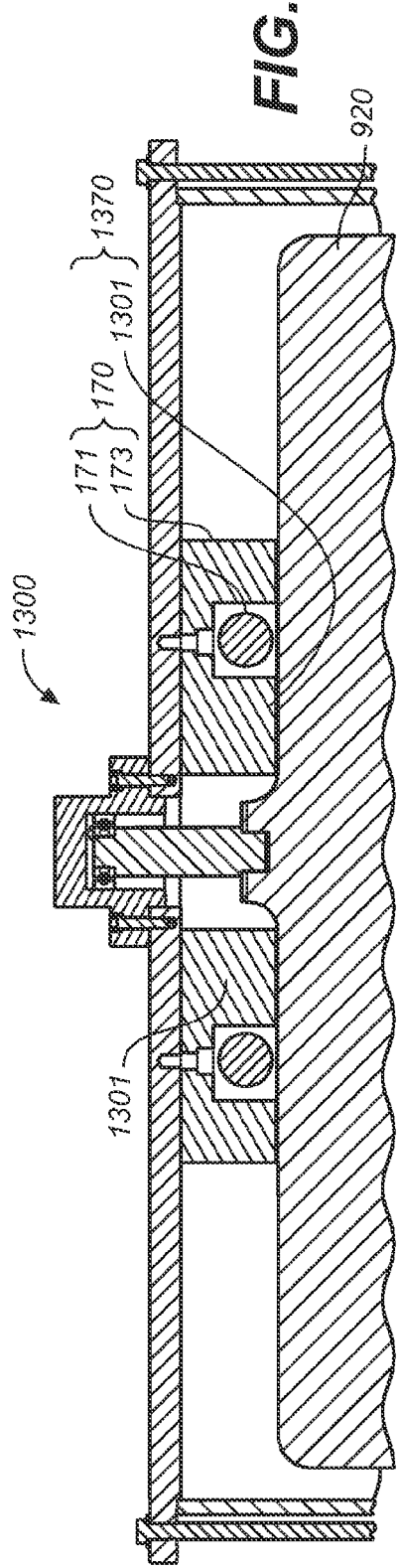

APPARATUS AND METHOD FOR MAGNETICALLY UNLOADING A ROTOR BEARING

CROSS-REFERENCE TO RELATED APPLICATIONS

This application claims the benefit of U.S. Provisional Application No. 61/692,631, filed Aug. 23, 2013, the disclosure of which is incorporated herein by reference in its entirety.

STATEMENT REGARDING FEDERALLY SPONSORED RESEARCH OR DEVELOPMENT

This invention was made with government support under DE-FOA-0000036 awarded by the U.S. Department of Energy. The government has certain rights in the invention.

BACKGROUND OF THE INVENTION

Field of the Invention

The present invention generally relates to rotors supported by mechanical bearings, and more particularly to a method and apparatus for unloading the weight of the rotor from its bearings.

Discussion of the Background

Rotors, such as those used for storing rotational kinetic energy, have shafts along their axis of rotation that are typically supported by rolling bearings. Thus, for example, a vertically oriented rotor may have a lower rolling bearing and an upper rolling bearing. For such configurations, the lower bearing must usually be designed to support the weight of the rotor.

While the use of rolling bearings to support rotors is effective, the typical use of such bearings requires large bearings. Thus, for example rotors used for energy storage may have a weight in excess of 1,000 pounds. Roller bearings capable of supporting large weights are necessarily large and expensive. In addition, as is known in the field, ball bearing lifetime is limited by raceway fatigue, and scales inversely with the cubic power of the bearing load.

There exists a need for an apparatus and method that can reduce the axial load on the roller bearing supporting a rotor. The apparatus and method should be compatible with existing rotor designs and be easy to implement. The apparatus and method should also provide for longer bearing lifetimes.

BRIEF SUMMARY OF THE INVENTION

The present invention overcomes the disadvantages of prior art rotor support apparatus and methods by unloading a large fraction of the weight supported by the bearings of a vertically mounted rotor. In one embodiment, the load on the bottom bearing is magnetically unloaded to a minimal preload setting as determined by an axial spring in series with the bottom bearing assembly. The preloading on the bottom bearing may be set to a desired and practical minimal value, thus avoiding ball skidding and any other drawbacks of a nearly unloaded bottom bearing. In one embodiment, this amount of preloading is accomplished by applying a magnetic lifting force that exceeds, by a small margin, the gravitational weight of the rotor. This small difference between magnetic lifting force and rotor weight constitutes the preload placed on the upper bearing. The present invention also comprises the mechanical system layout, and the controls needed to accurately prescribe the residual axial preload on the upper bearing.

Application of this level of magnetic force has three essential effects. First, loading on the bottom bearing can be entirely and precisely set with an axial spring. Second, with slip-fit mountings for the upper and bottom bearing outer rings (or raceways) in their respective bores, the rotor is lifted through a small axial clearance distance. This clearance is provided to allow for differential expansion of the rotor and housing under mismatched thermal conditions, and under Poisson effect induced rotor axial length variation due to centripetal loading. With the rotor fully lifted to a stopped position defined by the upper bearing assembly, the gap defining magnetic actuation forces is precisely set. As such, the magnetic lifting force of a prescribed winding current is very accurate and repeatable. Further, since the magnetic gap is at its minimal possible setting, the power required by a magnetic lifting winding is minimal. Third, an axial preloading force is imparted on the upper bearing. This preloading force is determined by the difference between the magnetic lifting force and the gravitational weight of the rotor.

Certain embodiments provide a method of operating a flywheel assembly, where the flywheel assembly includes a rotor having a vertical axis of rotation and a magnetic material, a mechanical bearing assembly connected to a housing, and an electromagnet positioned to levitate the rotor in the housing, where the bearing assembly allows axial motion of the rotor between a lower position having a maximum gap between the rotor and electromagnet, and an upper position having a minimum gap between the rotor and the electromagnet. The method includes providing a current to the electromagnet sufficient to operate the flywheel with the rotor at the upper position.

Certain other embodiments provide a method of operating a flywheel assembly, where the flywheel assembly includes a rotor having a vertical axis of rotation and a magnetic material, a mechanical bearing assembly connected to a housing, and an electromagnet positioned to levitate the rotor in the housing, where the bearing assembly allows axial motion of the rotor between a lower position having a maximum gap between the rotor and electromagnet, and an upper position having a minimum gap between the rotor and the electromagnet, and where a current applied to the electromagnet greater than an upper critical current is sufficient to lift the rotor from the lower position to the upper position, and where a current applied to the electromagnet greater than a lower critical current is sufficient to maintain the rotor at the upper position. The method includes: with the rotor at the lower position, increasing a current to the electromagnet to a first critical current sufficient to levitate the rotor to or near the upper position; with the rotor at or near the upper position, reducing the current to the electromagnet to a second critical current sufficient to levitate the rotor at or near the upper position; and operating the rotor with a current to the electromagnet equal to or greater than the second critical current.

Certain embodiments provide a flywheel apparatus comprising: a housing; a rotor; a bearing; a magnet. The rotor has a rotor weight and an axis of rotation aligned with gravity, and includes a magnetic material. The magnet includes an electromagnet, and is positioned to apply an attractive force on the magnetic material in a direction along the axis of rotation and counter the force of gravity. The bearing coupling the housing and the rotor permits rotation of the rotor about the axis of rotation and axial displacement of the rotor relative to the magnet. The flywheel apparatus also includes a magnetic flux sensor adapted to measure the magnetic flux between the magnet and the rotor, and a control system adapted to provide current to the electromagnet in response to the measured magnetic flux, where the current is greater than a critical current that applies an attractive force sufficient to support the weight of the rotor.

One embodiment unloads a lower rotor bearing by magnetically lifting the rotor by a predetermined axial displacement. This displacement is set by the range of axial play of each of the two bearing outer raceways (rings) in their respective bearing seats, where a slip fit is used for each of these bearings. This lifting displacement reduces the axial loading on the bottom bearing to a minimal preload that allows proper roller bearing function. As an example, the axial preload is a minimal fraction (e.g. 0.001 to 0.10) of the bearing rated dynamic load capacity.

Another embodiment provides an apparatus for unloading a lower rotor bearing. The apparatus includes a housing, a rotor including a magnetic material and having an upper shaft and a lower shaft, a lower roller bearing attached to the lower shaft and the housing, and a lifting winding attached to the housing. When a current is provided to the lifting winding, the rotor is lifted against the force of gravity such that the load on the lower roller bearing is reduced to a value less than the weight of the rotor.

Yet another embodiment includes an axial spring in series with the outer raceway of the lower bearing that precisely sets the axial preload on the bottom bearing, when rotor is magnetically lifted with force in excess of its weight.

One embodiment includes a force sensing element (e.g. a strain gauge) in series with either or both of the upper and lower outer raceways, to be used to precisely set bearing preload by calibrated or feedback control of magnetic lifting winding current.

Another embodiment includes a magnetic field sensing element, such as a Hall Effect sensor, to sense the offloading electromagnet flux density. As will be described, magnetic force scales very accurately with the square of the gap magnetic flux density. As such, the offloader electromagnet force can be precisely assessed by measurement of the gap magnetic flux density. This measured magnetic field quantity can be conveniently used in the offloader control to precisely set the axial preload force on the upper bearing.

Yet another embodiment combines use of measured gap magnetic field and winding current, in a control system to precisely set the upper bearing axial preload force without use of any direct force sensor.

These features together with the various ancillary provisions and features which will become apparent to those skilled in the art from the following detailed description, are attained by the apparatus and method of the present invention, preferred embodiments thereof being shown with reference to the accompanying drawings, by way of example only, wherein:

BRIEF DESCRIPTION OF THE SEVERAL VIEWS OF THE DRAWING

FIG. 1 is a schematic cross-sectional of a first embodiment flywheel apparatus of the present invention;

FIG. 2A shows the rotor in an extreme lower position, and FIG. 2B shows the rotor in an extreme upper position;

FIG. 12 is a schematic cross-sectional of a flywheel apparatus of the present invention having a second embodiment magnet; and FIG. 13 is a schematic cross-sectional of a flywheel apparatus of the present invention having a third embodiment magnet.

Figure 2A:
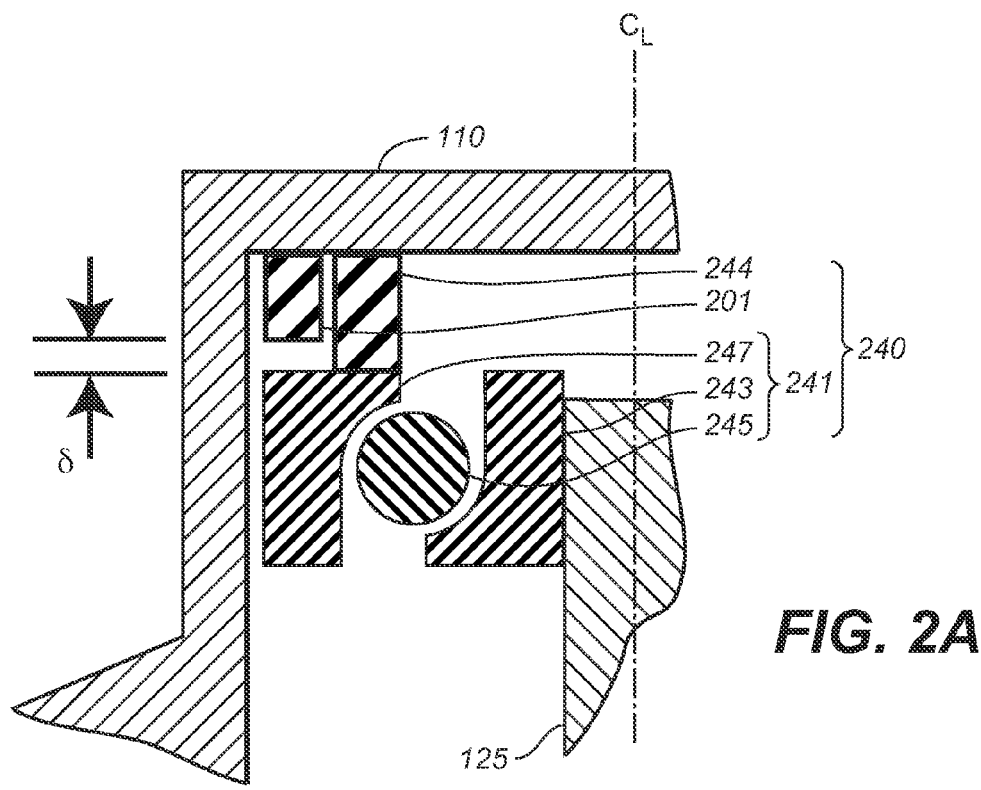
FIGS. 2A and 2B are schematic cross-sectional views of a first embodiment upper bearing assembly, where

Reference symbols and labels are used in the Figures to indicate certain components, aspects or features shown therein, with reference symbols and labels common to more than one Figure indicating like components, aspects or features shown therein.

DETAILED DESCRIPTION OF THE INVENTION

The following description describes, in detail, specific embodiments of an apparatus and method that provides for magnetic unloading of conventional roller bearings that support a rotor. Unloading of rotor bearings reduces the running friction and also increases the bearing lifetime. Thus, for the example of the use of a rotor in a flywheel energy storage system, the inventive unloading can reduce the running friction to negligible levels and extend bearing lifetime by orders of magnitude. In addition, the inventive structure and method provides magnetic support for a rotor at its minimal possible setting such that the power required by a magnetic lifting winding is minimal.

FIG. 1 is a schematic cross-sectional view of a first embodiment flywheel apparatus 100 which includes a housing 110, a rotor 120 having a rotational axis CL, and bearings for supporting the rotor and permitting rotation, and which may include a lower bearing assembly 130 and an upper bearing assembly 140. Flywheel apparatus 100 also includes a magnet 170; power components 150 for adding or removing power from rotor 120; and a control system 160. Flywheel apparatus 100 and bearing assemblies 130 and 140 are generally symmetric about a centerline CL. As discussed subsequently, bearing assemblies 130 and 140 support rotor 120 while permitting some axial motion of the rotor, indicated by arrow A, and where the total range of axial motion is indicated as δ.

As discussed subsequently, magnet 170 includes an electro-magnet, which is also referred to herein without limitation, as an "offloader" or "offloader electromagnet," which may be operated to provide a force on rotor 120 that is counter to the gravitational force. When the electro-magnet of magnet 170 is actuated, such as by a current applied by control system 160, the rotor may move upwards by, for example, the indicated distance δ. In one embodiment, a minimal distance, δ, may be for example, from 0.25 mm (0.01 inches) to 1.0 mm (0.04 inches), to allow for anticipated differential expansion.

A portion of the support of rotor 120 is thus transferred to magnet 170, and thus reduces the amount of downwards force on bearing assembly 130. The reduced bearing loading is beneficial in that a smaller, lighter bearing may be used and/or bearing life may be increased over a bearing that must support the entire rotor weight.

Housing 110 includes a housing body 111 which surrounds rotor 120 and may, for example, be evacuated of air to reduce frictional losses from the spinning rotor. Housing 110 also includes components of magnet 170, including but not limited to an upper housing member 173 formed of or including a magnetic material and lifting winding 171. The magnetic material of upper housing member 173 may be, for example and without limitation, steel. In alternative embodiments, magnet 170 is located above rotor 120 and is separate from housing 110. Magnet 170 is thus arranged to provide a lifting force on rotor 120.

As discussed subsequently, various embodiments of housing 110 and/or magnet 170 may include, for example and without limitation, sensing elements to determine the state of the operation of magnet 170 and/or rotor 120.

Rotor 120 has a rotor body 121 that is formed from or includes a magnetic material, a lower shaft 123, and an upper shaft 125. In one embodiment, rotor 120, for example and without limitation, is formed from a magnetic material, such as steel and has a weight W of from 45 kg (100 lbs.) to 27,000 kg (60,000 lbs.).

Power components 150 include, but are not limited to a motor-generator comprising a rotor 151 attached to lower shaft 123 and a stator 153 attached to housing 111. Power components 150 are well known in the field and are used convert electrical energy to rotational energy in rotor 120.

In general, bearing assemblies 130, 140 provide rotational support for rotor 120 within housing 110. Assemblies 130 and 140 illustrated in FIG. 1 are generic, and more specifically, as discussed subsequently, lower bearing assembly 130 includes a roller bearing that connects lower shaft 123 and housing 110, and upper bearing assembly 140 includes a roller bearing that connects upper shaft 125 and the housing. In addition, various embodiments of bearing assemblies 130 and/or 140 may include, for example and without limitation, springs that permit axial motion and forces on a bearing, a stop to limit the axial motion of a bearing, and/or a sensor for measuring an axial force or displacement on a bearing. The axial growth (or attenuation) of the rotor and small axial displacement of rotor 120 may be provided or mitigated by combinations of springs, stops, and magnets, to provide a range of δ of up to about 1 millimeter during the operation of flywheel assembly 100.

Figure 2B:
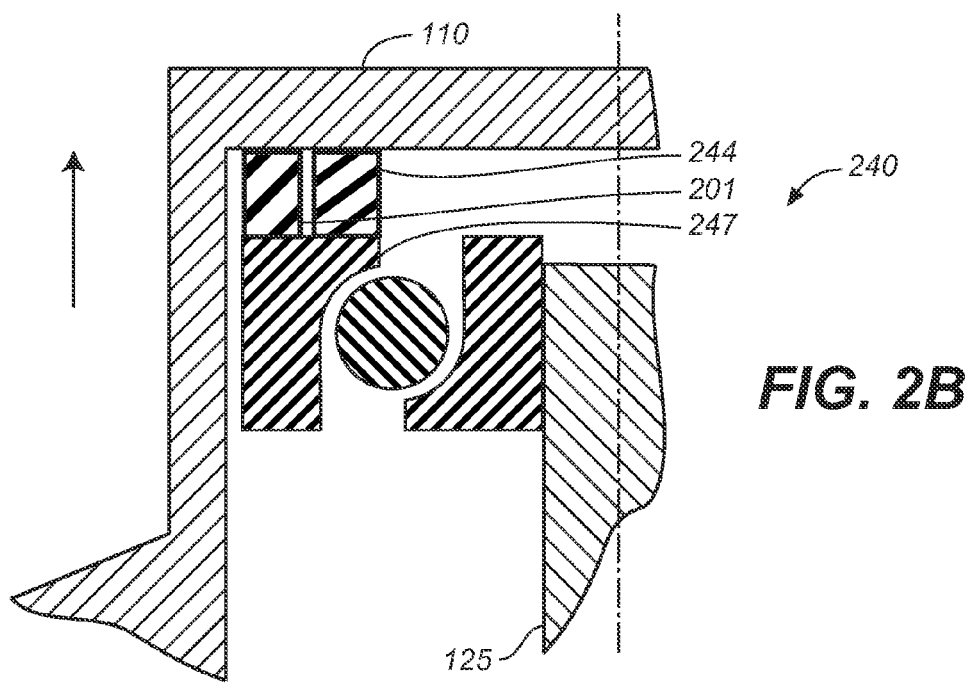

In general, the minimum requirement for the bearing assemblies 130, 140 is that they include at least one set of bearings and allow for some axial motion of rotor 120. FIGS. 2A and 2B are schematic cross-sectional views of a first embodiment upper bearing assembly 240, where FIG. 2A shows the rotor 120 in an extreme lower position and FIG. 2B shows the rotor in an extreme upper position. Upper bearing assembly 240 is generally similar to bearing assemblies 130 and 140, except as explicitly discussed below.

As shown in FIG. 2A, upper bearing assembly 240 supports upper shaft 125 in housing 110. More specifically, upper bearing assembly 240 includes bearings 241 which include a bearing inner portion 243, ball bearings 245, and a bearing outer portion 247. The inner portion of bearing 241 is connected to rotor 120 with, for example, bearing inner portion 243 being press-fit to upper shaft 125 and bearing outer portions 247 connected to housing 110. Upper bearing assembly 240 also includes an upper axial spring 244 that connects housing 110 and bearing outer portion 241, and a rigid piece indicated as a stop 201 that is connected to housing 110 and which limits the spring motion. Spring 244 may be, for example and without limitation, a wave or Bellville washer, and may be configured to provide a downwards force on rotor 120.

In the extreme lower rotor position of FIG. 2A, there is a gap of dimension δ between the bearing outer portion 241 and the stop residing in the housing 110. In the extreme upper rotor position of FIG. 2B, bearings 241 are forced upwards until bearing outer portion 241 contacts stop 201. Upper bearing assembly 240 thus allows rotor 120 to rotate and provides axial displacement limited by the size of stop 201.

Figure 3:
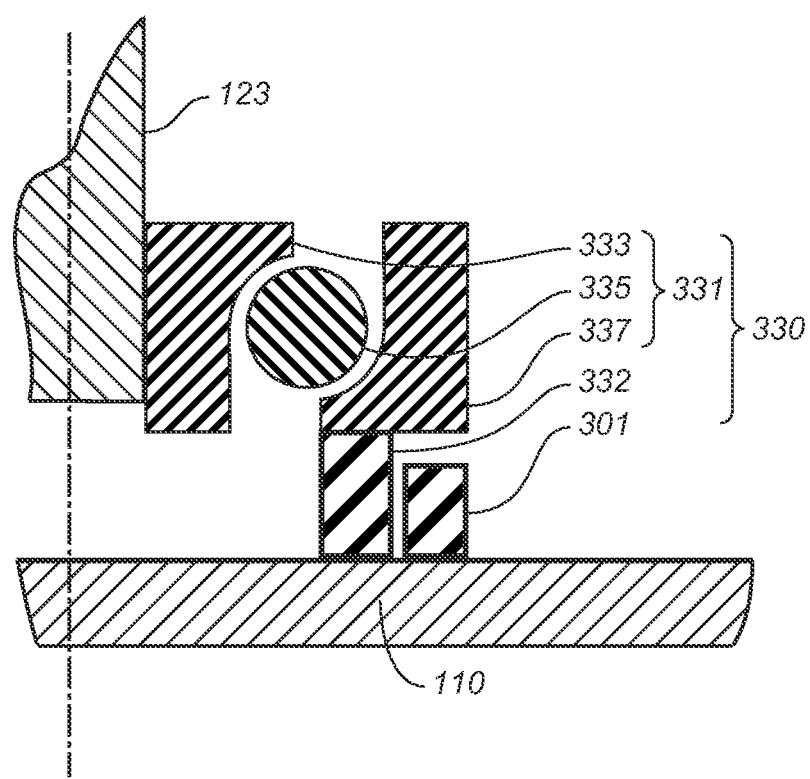
FIG. 3 is a schematic cross-sectional view of a first embodiment lower bearing assembly.

FIG. 3 is a schematic cross-sectional view of a first embodiment lower bearing assembly 330. Lower bearing assembly 330 is generally similar to bearing assemblies 130, 140, and 240, except as explicitly discussed below.

As shown in FIG. 3, lower bearing assembly 330 supports lower shaft 123 in housing 110. More specifically, lower bearing assembly 330 includes bearings 341 which include a bearing inner portion 333, ball bearings 335, and a bearing outer portion 337. The inner portion of bearing 331 is connected to rotor 120 with, for example, inner bearing portion 333 being press-fit to lower shaft 123 and bearing outer portion 337 connected to housing 110. Lower bearing assembly 330 also includes a lower axial spring 332 that connects housing 110 and bearing outer portion 331, and an optional rigid stop 301 that is connected to housing 110 and which limits the spring motion. Spring 332 may be, for example and without limitation, a wave or Bellville washer, and may be configured to provide an upwards force on rotor 120. Lower bearings 331 may be similar to upper bearings 341, or may be different in construction or load bearing capability.

The lifting force on rotor 120 by magnet 170 is determined by a gap g, which is the distance between the poles of the magnet and the rotor. It is apparent from FIG. 1 that gap g varies with the axial displacement δ, depending on rotor and magnet geometry. Thus, when the rotor moves to an extreme upwards position, g is a minimum, and when the rotor moves downwards by the distance δ, g is at a maximum distance. In addition, as the gap g changes, the forces on rotor 120 from movement of springs, such as from lower axial spring 332 and upper axial spring 244, may also change, depending on the spring design.

The outer portions of bearings 241 and 331 are mounted with a slip fit, with radial clearance of 2.5 μm (0.0001 inches) to 25 μm (0.001 inches). Axial play δ is only provided to allow for necessary differential length expansion of rotor relative to housing due, for example, to mismatched thermal conditions, or to Poisson effect induced rotor axial length variation due to centripetal loading.

This is nominally only needed at one end, the bottom, when magnet 170 is actuated. In one embodiment, slip fits are provided for both bearings 241 and 331 to be able set the bearing forces with axial springs 244 and 332 when magnet 170 is either active (with bottom spring 331 and slip fit) or inactive (need top spring and slip fit).

Control system 160 may be used to provide a current I to lifting winding 171. Specifically, when current I is applied to lifting winding 171, the resulting magnetic field produces an attraction to magnetic materials in rotor body 121 that is counter to weight of the rotor body. Thus, for example, without any current in lifting windings 171 the combined bearing forces on bearing assemblies 130 and 140 is the weight of the rotor. With the application of a current to lifting windings 171, the combined bearing forces on bearing assemblies 130 and 140 is the rotor weight less the attractive force of rotor 120 to lifting windings.

The following simplified analysis provides some understanding of the forces involved in flywheel assembly 100 and in particular on bearing assemblies 130 and 140.

The forces on rotor 120 include the combination of the downward weight W of the rotor, a downward force $f_{UB}$ exerted by upper bearing 141, an upwards force $f_{LB}$ exerted by lower bearing spring 141, and upwards lifting force induced by magnet 170, which may be written as F.

The forces on bearings 241 and 331 are thus a combination of W and F, and the forces imposed by axial springs 244 and 332 and any stops that are encountered by the movement of the bearings, such as stop 201 and/or stop 301. In general axial springs 244 and 332 may both be provided with a small amount of axial preloading, such as a minimal fraction (e.g. 0.001 to 0.10) of the rotor weight W. It is particularly important that rotor 120 does not contact any stationary parts. In addition, as discussed below, as rotor 120 approaches magnet 170, the attractive force increases under fixed magnet current, and some method is desirable to fix a minimum magnet-rotor spacing.

Since the lower bearing force is reduced by an increase in lifting force F, it is seen that the application of a lifting force may greatly decrease the forces on the bearings of lower bearing assembly 130. In certain embodiments, as discussed below, the force F is adjusted to balance, or nearly balance, the weight W, and the upper and lower bearing forces become nearly the same, and may have a value equal to the small amount of preloading noted above.

Figure 4:
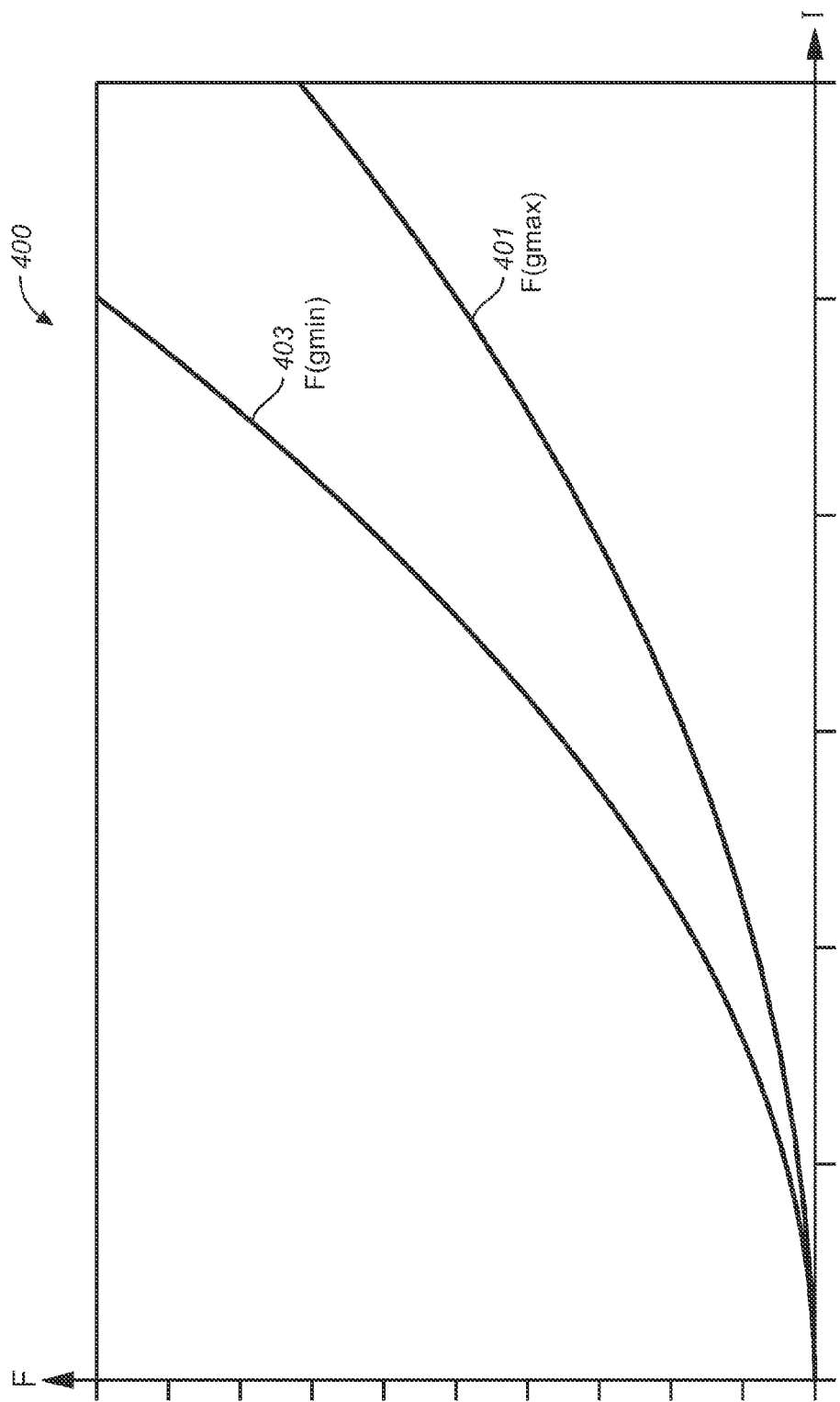
FIG. 4 is a graph showing the lifting force as a function of electromagnet current for two values of the gap.

A simplified analysis, based on use of high permeability linear magnetic materials, shows that the value of F increases with the square of the current I and inversely with the square of the gap g. Thus, for example and without limitation, an idealized model of electromagnet components of magnet 170 of FIG. 1 is shown in FIG. 4 as a graph 400 showing the lifting force, F, as a function of electromagnet current, I, for two values of the gap g. A first curve 401 is computed for a maximum value of g ($g=g_{max}$), that is, where rotor 120 is in an extreme lower position, as shown for example in FIG. 2A, and a second curve 403 is computed for a minimum value of g ($g=g_{min}$), that is where the rotor is in the extreme upper position, as shown for example in FIG. 2B. The lifting force F of magnet 170 on rotor 120 is approximated by $F=k(g)*I^2$, where the direction of F is upwards in FIG. 1, I is the current provided to lifting winding 171, and k(g) is a constant that depends on the gap g. More specifically, a decrease in g will increase k(g), that is, the attraction becomes greater as rotor 120 approaches electromagnet 170. With idealized magnetic material of infinite permeability, k(g) would exhibit an inverse-square dependence.

With no current (I=0), rotor 120 is at an extreme lower position, and the curve 401 provides the value of the lifting force F as a function of I. When the current is sufficient to lift the rotor to an extreme upper position, the value of the lifting force increases to that provided by curve 403. Rotor 120 thus has two stable mechanical positions depending on the current.

Figure 5:
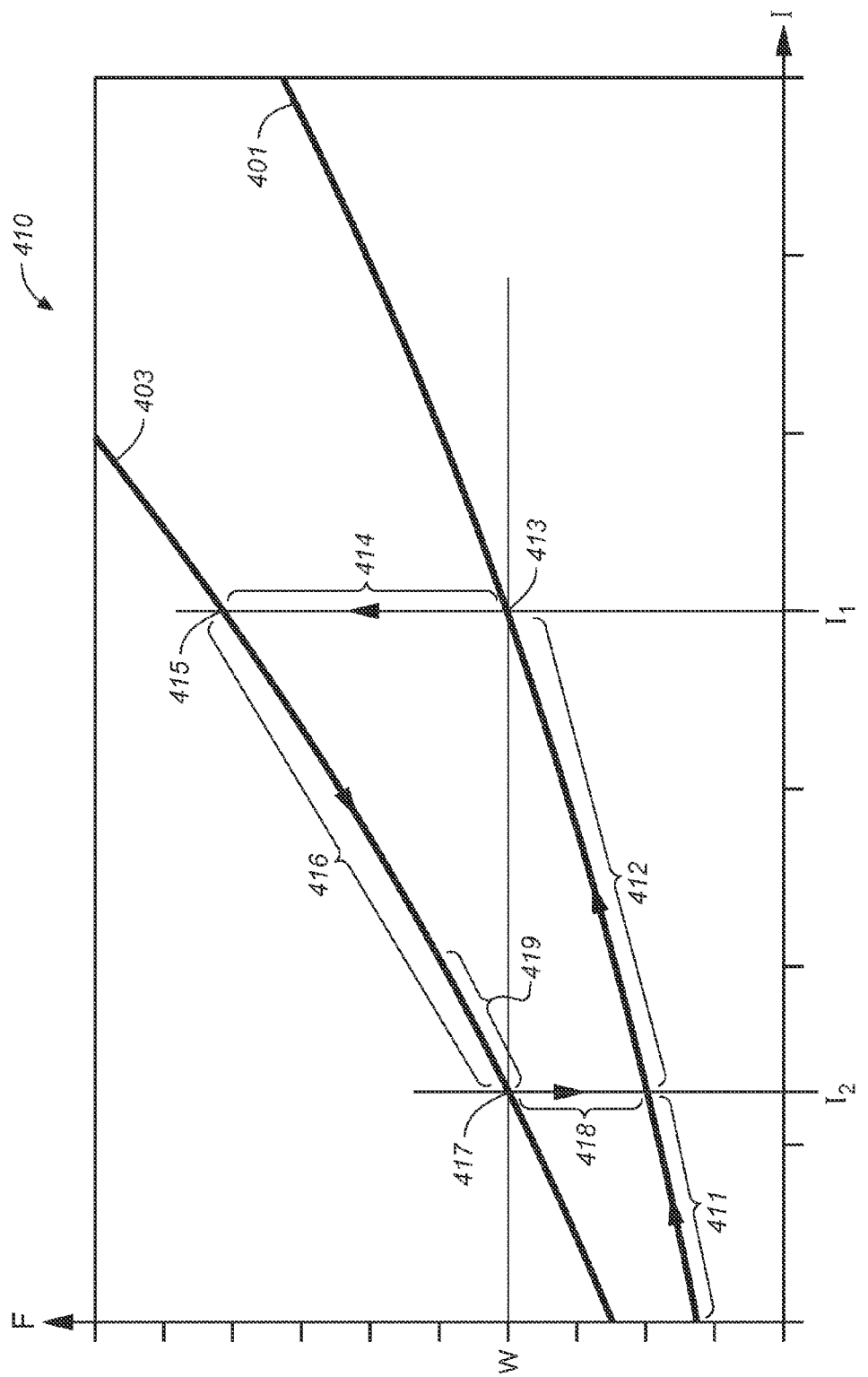
FIG. 5 is a graph showing the lifting force as the current is varied during operation of the flywheel apparatus.

One way of analyzing the dynamics of flywheel apparatus 100 is illustrated further in FIG. 5 as a graph 410 showing the lifting force F as the current I is varied during operation of the flywheel apparatus 100. Starting from rest, the gap is a maximum ($g=g_{max}$) and the application of current to magnet 170 increases lifting force F along curve 401, shown as curve portions 411 and 412. At some first, or upper critical current, indicated as $I_1$, lifting force F overcomes the weight W and other forces on rotor 120, such as spring preloading, as indicated by a point 413 of curve 401. At this point the axial position of rotor 120 is unstable and any slight increase in current or slight upwards axial motion of the rotor will cause the rotor to rise, decreasing g to a value of $g_{min}$, as indicated by curve portion 414 which terminates at a point 415 on curve 403. Note that at this smaller gap g, the lifting force F has increased to a value much greater that the weight W, forcing the rotor to the extreme upper position of FIG. 2A. The instability at the critical point is due to the large negative stiffness of the attractive magnet assembly.

With the rotor operating along curve 403, the current I may be decreased, as shown by curve portion 416. At some second, lower critical current, indicated by $I_2$, the lifting force again balances the forces on rotor 120, at a point 417 on curve 403, and the position of the rotor falls to a gap of $g_{min}$ and the operation of the rotor is along curve 401. The lifting force in now insufficient to levitate the rotor, and an increase in current moves back along portion 412 to point 413. The current force diagram thus demonstrates hysteresis with changes in current.

Certain embodiments operate the inventive flywheel assembly to reduce the load on the bearings, and specifically to a bearing in lower bearing assembly 130. The reduced operating load results in a reduced bearing size, and cost and increased lifetime.

In general, it is thus seen that the magnetic lifting force is thus accompanied by a substantial negative stiffness. When this lifting force roughly matches the rotor weight, and thus far exceeding the passive mechanical spring preloads, the accompanying negative stiffness also far exceeds the passive positive stiffness(es) of the preloading springs. As a consequence, the rotor will find a stable equilibrium in one of the two extreme axial positions. These positions correspond to either: 1) the lower bearing outer raceway residing in its extreme axial position in its seat (set by mechanical stop), or 2) the upper bearing outer raceway residing in its respective extreme axial position. This strategy of operation at an extreme axial position is desired because of the relatively high axial stiffness that results. Remaining axial compliance is due to the bearing axial stiffness, itself.

It is expected that that operation where the magnetic lifting force is large enough to guarantee that the upper bearing outer raceway is positioned against its stop is the preferred position, and design. This requires additional lifting force beyond that required to simply unload the bearings.

Positioning the rotor at its upper axial extreme position is strategic for two reasons: (i) the magnetic gap of the lifting structure is held at its minimum. This minimum (e.g. 1-3 mm) is set by manufacturing tolerances. The minimum gap results in minimum lifting current and power dissipation to achieve the specified lifting force; and (ii) the magnetic gap remains invariant over operating conditions as differential expansions between rotor and housing occur. These differential expansions are taken up at the bottom bearing seat.

Thus, lifting power dissipation for equilibrium is held to its practical minimum, the magnet current to affect this lifting force is nearly invariant during operation.

In certain embodiments, it is preferable to operate flywheel apparatus 100 such that lifting force F closely and stably balances the weight W. Curve portion 419 illustrates a stable operating range of flywheel apparatus 100 with a gap value of $g_{min}$ such that the rotor 120 is closer to magnet 170, and the lifting force closely matches the weight of the rotor. Specifically, at such conditions, the rotor weight is lifted, with magnet 170 supporting the weight of the rotor, and the axial force on the bearing of bearing assembly 130 is on the order of the amount of preloading of any spring in the bearing assembly 130, which can be a small fraction of the weight of the rotors, such as in the range of 1% of bearing rated dynamic load capacity.

With rotor 120 thus lifted, the load on lower bearing 331 is set precisely by axial spring 332, and the load on upper bearing 241 is set by difference of magnetic force and rotor weight. Under some conditions, the difference between the magnetic force and rotor weight will equal the spring force in upper assembly. Under other conditions, specifically where the negative magnet stiffness exceeds the positive spring stiffness, upper bearing 241 will contact stop 210, and the load on upper bearing 241 will be in excess of the preloading of spring 244. The reduced operating load on the bearing results in a reduced bearing size and cost and increased lifetime.

In one embodiment, control system 160 cycles the current between $I_1$ and $I_2$, and then provides a current slightly higher current than 12, on curve portion 419. In another embodiment, the control system 160 provides open loop control by determining currents $I_1$ and $I_2$ before operation of flywheel system 100 and storing the values in a look-up table, and the flywheel is then operated by increasing the current to $I_1$, and then decreasing the current to a value slightly above the value $I_2$ to operate on curve portion 419.

In general, it may be difficult to set current (or to specify magnet strength) in an offloading magnet device with a simple open-loop set point. This difficulty arises from the lifting magnet parametric uncertainties. Uncertainties arise from geometric variation in the magnetic gap and area, occurring in both manufacture (tolerance) and operation. Parametric variations in operation occur with magnetic gap variation in response to: (i) differential thermal expansion between rotor and housing, and (ii) to applied magnetic lifting force. Specifically, magnetic lifting force may directly affect the equilibrium position of the rotor against a passive axial spring loading element.

The following discussion describes two embodiments for more directly controlling the lifting of rotor 120 by using sensors and feedback control. The first utilizes mechanical sensors or measurements to determine the position of or forces on rotor 120. The second utilizes electrical (non-mechanical) sensors or measurements to determine the magnetic flux and thus determine the operating condition of the flywheel apparatus 100.

Mechanical Sensing and Method of Operation

Certain embodiments include sensor and/or measurements of rotor displacement. In certain embodiments, control system 160 may receive input from sensors of flywheel assembly 100 which may be used to regulate the current I through feedback control to operate rotor 120 at an extreme upper position with a current that is as close to the minimum current $I_2$ as is practically possible.

Figure 6:
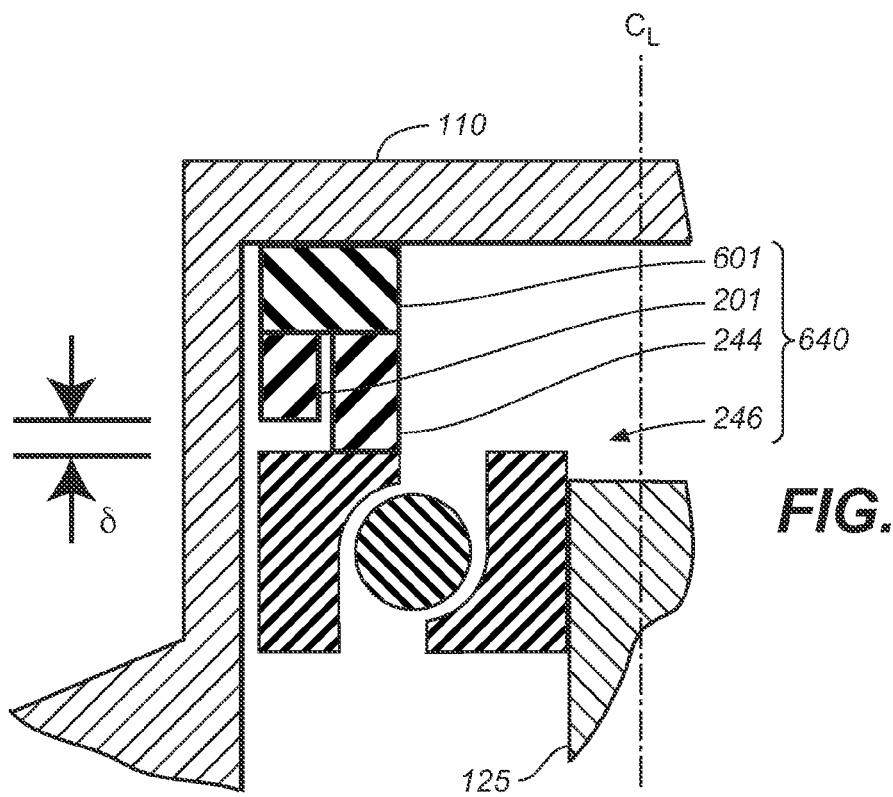
FIG. 6 is a schematic cross-sectional view of a second embodiment upper bearing assembly.
Figure 7:
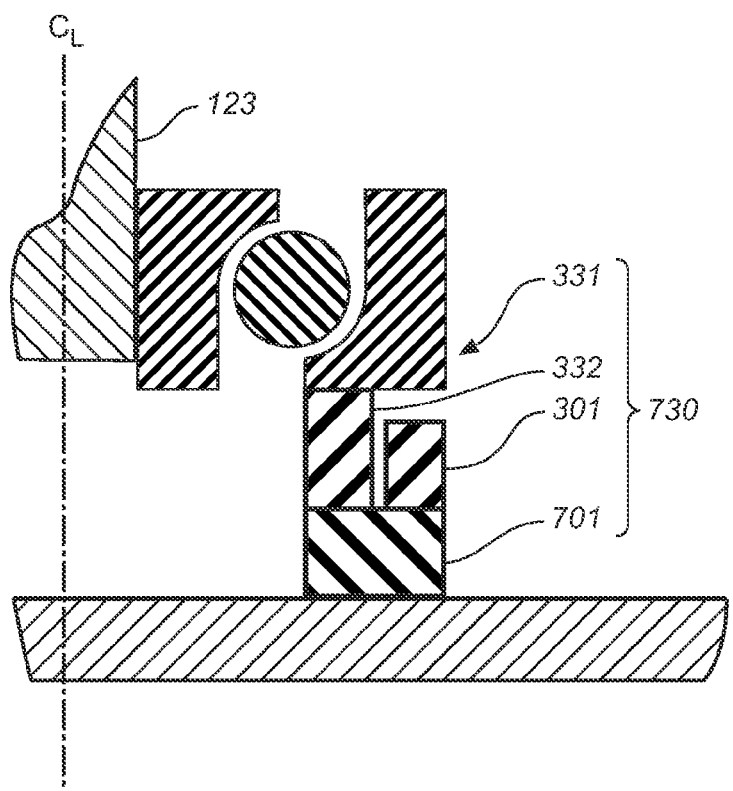
FIG. 7 is a schematic cross-sectional view of a second embodiment lower bearing assembly.

As an example of using mechanical sensing to control flywheel assembly 100, one or more force sensors may be provided to flywheel assembly to measure forces and provide an output to control system 160. Thus, for example, FIG. 6 is a schematic cross-sectional view of a second embodiment upper bearing assembly 730 and FIG. 7 is a schematic cross-sectional view of a second embodiment lower bearing assembly 730. Bearing assemblies 640 and 730 are generally similar to the other bearing assemblies 130, 140, 240, 330, described herein, except as explicitly discussed subsequently.

As shown in FIG. 6, upper bearing assembly 640 includes the components of upper bearing assembly 240 and a strain gauge 601. Strain gauge 601 is attached to housing 110, and stop 201 and axial spring 244 are both attached to the strain gauge. The operation of upper bearing assembly 640 is thus generally similar to that of bearing assembly 240, and uses strain gauge 601 to measure the forces transmitted from rotor 120 to the upper bearing assembly and provide the measurement to control system 160.

As shown in FIG. 7, lower bearing assembly 730 includes the components of lower bearing assembly 330 and a strain gauge 701. Strain gauge 701 is attached to housing 110, and stop 301 and axial spring 332 are both attached to the strain gauge. The operation of lower bearing assembly 640 is thus generally similar to that of bearing assembly 330, and uses strain gauge 701 to measure the forces transmitted from rotor 120 to the lower bearing assembly and provide the measurement to control system 160.

In one embodiment, control system 160 accepts and uses the signal of upper strain gauge 601 as an indication of the axial load on upper bearing 241. The output strain gauge 601 may then be used in a low bandwidth control loop, via conventional signal feedback or for calibration, to accurately set a preload on upper bearing 201. The axial preload of lower bearing 331 is set by lower axial spring 332.

In another embodiment, force F is used to hold rotor 120 against stop 201, and only one strain gauge measurement is needed in the upper bearing, as for example by strain gauge 601, while no strain gauge is provide on lower bearing assembly 130. The axial load on lower bearing 331 is set by the preload spring in the bottom bearing mount.

Figure 8:
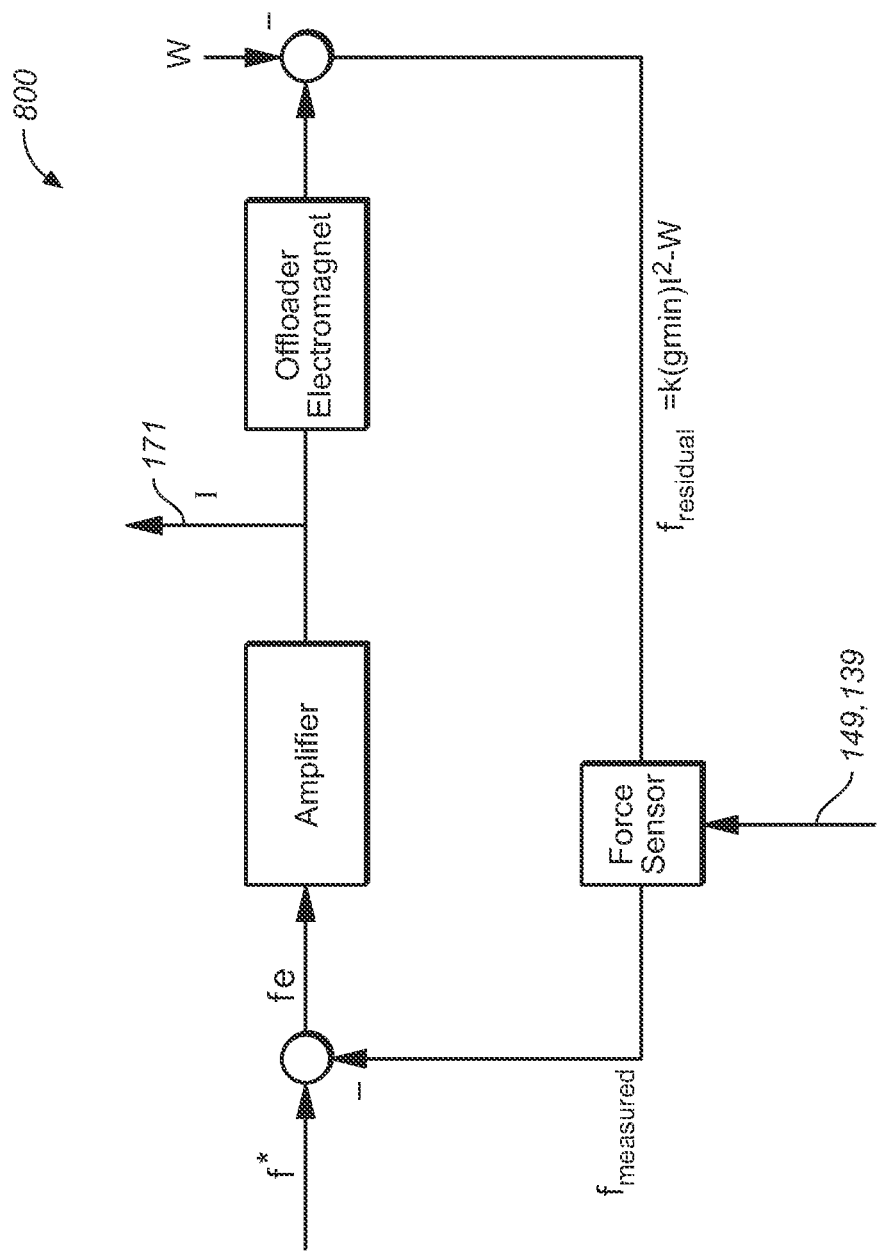
FIG. 8 is a control system diagram illustrating one embodiment of a control algorithm of the present invention.

FIG. 8 is a control system diagram illustrating one embodiment of a control algorithm 800 of the present invention that may be implemented as an analog or digital control system 160. In general, control algorithm 800 accepts a measure of the force on upper bearing 241 as sensed, for example, a force sensor which may be, for example, strain gauge 601, and provides a current I to lifting winding 171 to operate flywheel apparatus on the curve portion 419 of FIG. 5.

Algorithm 800 has a stored reference signal f* that is indicative of the desired axial force on upper bearing 231 and calculates a residual force, which may be written as $f_{residual} = k(g_{min})*I^2 - W$. The residual force is sensed by strain gauge 601, which produces an output analog signal $f_{measured}$. Algorithm 800 subtracts $f_{measured}$ from f*, to produce error signal $f_e$, which is then amplified to produce the desired amount of current I to lifting winding 171.

Non-Mechanical Sensing and Method of Operation

Figure 9:
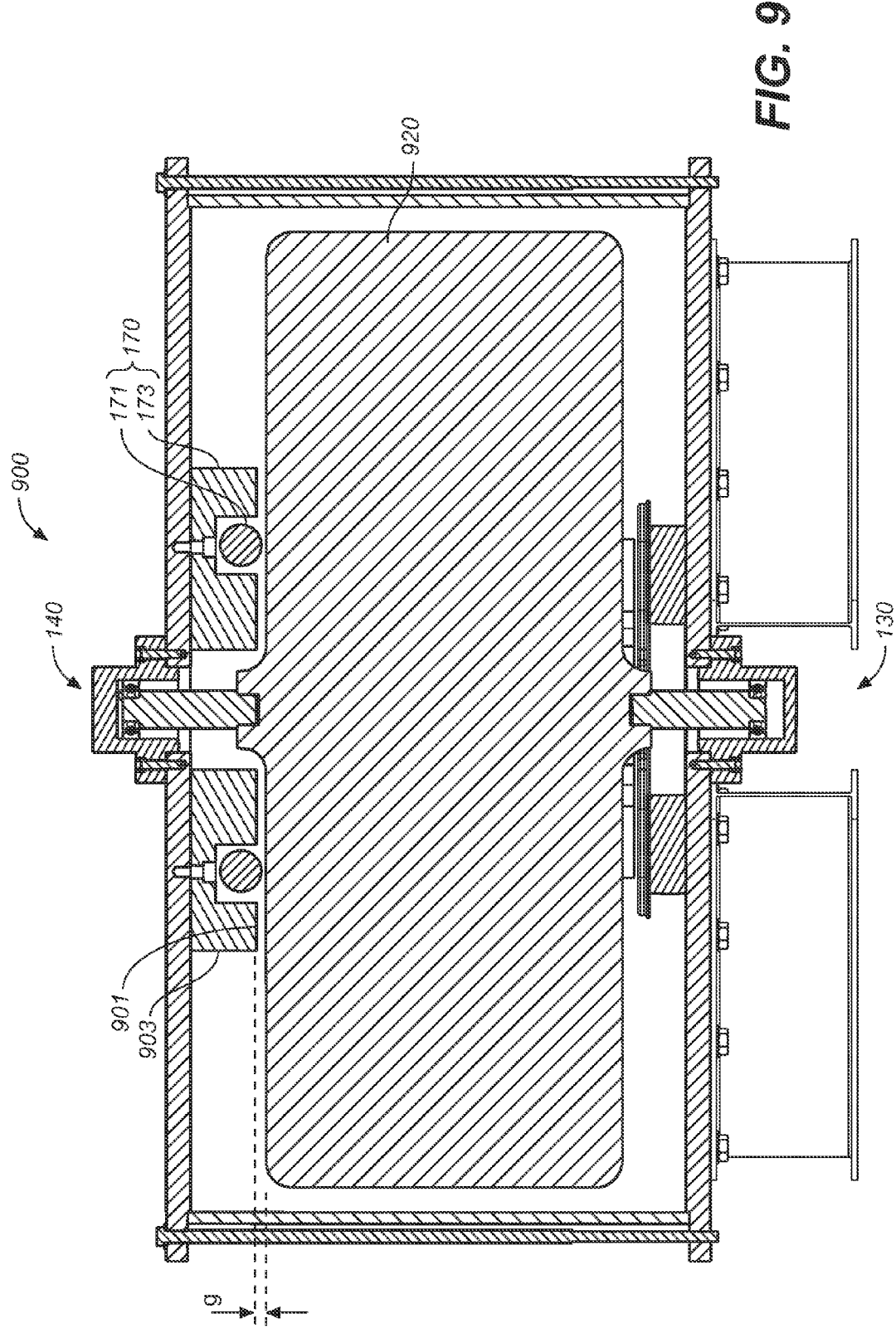
FIG. 9 is a schematic cross-sectional of a second embodiment flywheel apparatus of the present invention.

The following discussion provides alternative embodiments for control of flywheel assembly 100 based on measurements related to the magnetic flux the produces force F. FIG. 9 is a schematic cross-sectional of a second embodiment flywheel apparatus 900. Flywheel apparatus 900 is generally similar to flywheel apparatus 100, except as explicitly discussed subsequently.

Flywheel apparatus include a rotor 920 that is more cylindrically shaped than rotor 120, but is otherwise generally similar. Rotor 920 may be used in any of the previous embodiments, which may be for example and without limitation the embodiments of any one of FIG. 1, 2, 3, 6 or 7. Alternatively, the non-mechanical sensing and method of operation of this section may be incorporated into rotor 120, or rotors of other, different geometries.

Flywheel apparatus is also provided with one or more gap magnetic field sensing elements. FIG. 9 shows the placement of a first Hall sensor 901 which is located directly in the gap between rotor 920 and electromagnet 170 and measures the field within the gap, and a second Hall sensor 903 which is located on an outer edge of the electromagnet lifting pole and which senses the fringing field, which is directly proportional to the direct gap field.

Figure 10:
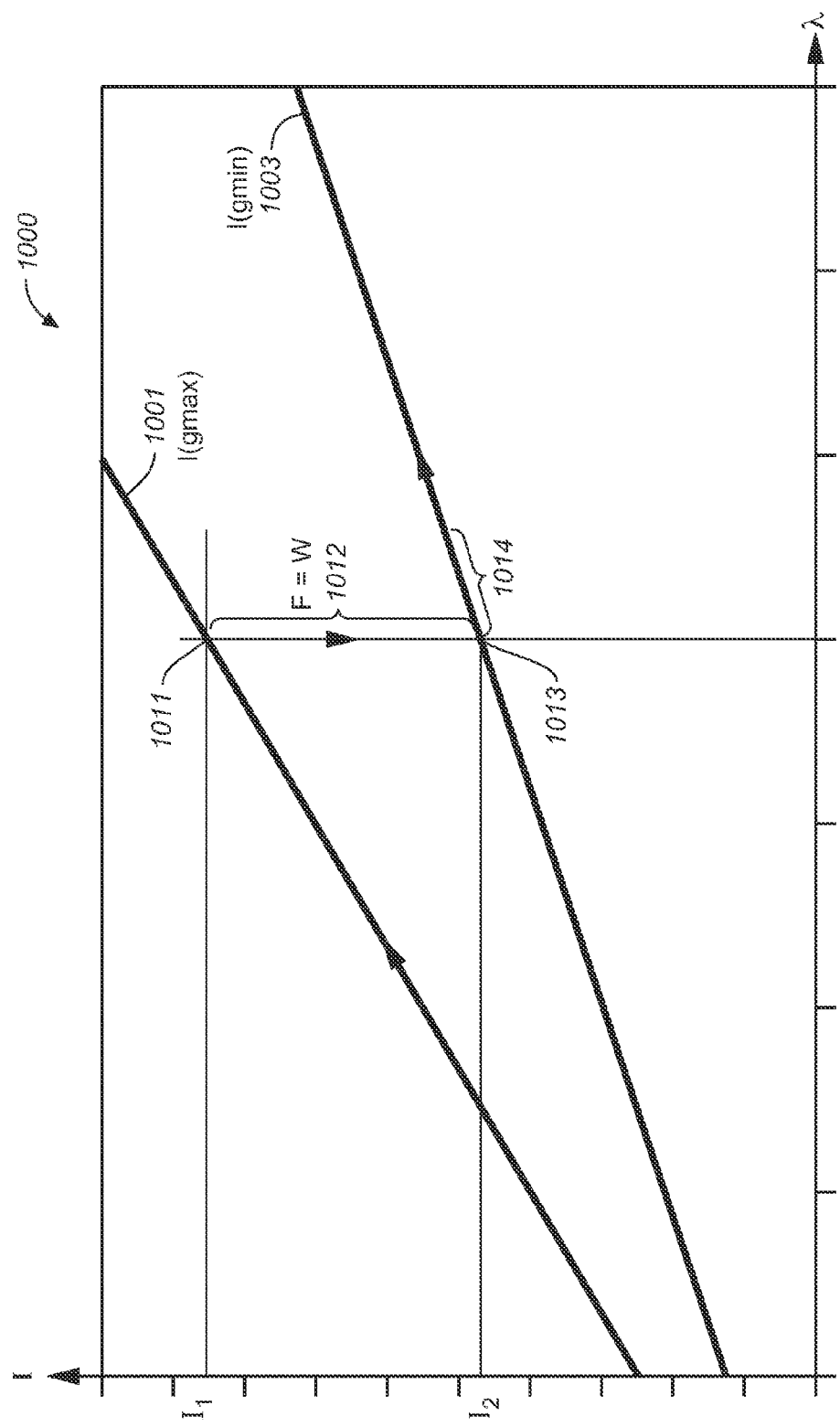
FIG. 10 is a graph showing the current as a function of the flux linkage for two values of the gap.

The magnetic lifting force F may be described as $F=k_B\lambda^2$, where $\lambda$ is the winding flux linkage, and $k_B$ is essentially independent of magnetic gap g. The winding flux linkage is defined as the integral of the magnetic flux density normally crossing the gap, multiplied by the number of winding terms. Use of measured gap flux, or alternatively a signal that is physically proportional to the gap flux, provides a measurement signal for precise and accurate control of the magnetic unloading force. FIG. 10 is a graph 1000 showing the current I as a function of flux linkage $\lambda$ for the electromagnet for two values of the gap-curve 1001 shows the current for the maximum gap $g_{max}$, and curve 1003 shows the current for the minimum gap $g_{min}$.

As flux is increased from zero, the current I increases proportionally according to the reciprocal winding inductance with largest gap dimension $g_{max}$ along curve 1001. This is the smallest value of winding inductance. As flux increases, the magnetic force rises until it balances the rotor weight. At this critical value of $I=I_1$ which is indicated as point 1011, and which is discussed above with reference to FIG. 5, the rotor rises, as indicated by a curve portion 1014, resulting in new magnetic gap $g_{min}$, and a corresponding maximum winding inductance. The winding current I reduces from $I=I_1$ to $I=I_2$ since the flux cannot change instantaneously. Subsequent increases in flux follow curve 1003, corresponding to maximum inductance, and minimal winding current. This region, and especially a portion 1014 near point 1013, defines the preferred efficient region of operation. Reference values of flux and of winding current can be derived from observation of this transition.

The electrical parameter that delineates the two curves in FIGS. 4 and 10 is the offloader winding inductance. Thus the transition values of current $I_1$ and $I_2$, and of flux $\lambda$, are reflected in the instantaneous winding inductance value. The instantaneous winding inductance value can be determined by computing the static ratio of flux lambda to winding current. Alternatively, the instantaneous winding inductance value can be determined by injecting a small amplitude ripple signal into the winding, and resolving the ratio of the ripple flux to the ripple current. The ratio of ripple flux to ripple current is also defined by the winding inductance.

Figure 11:
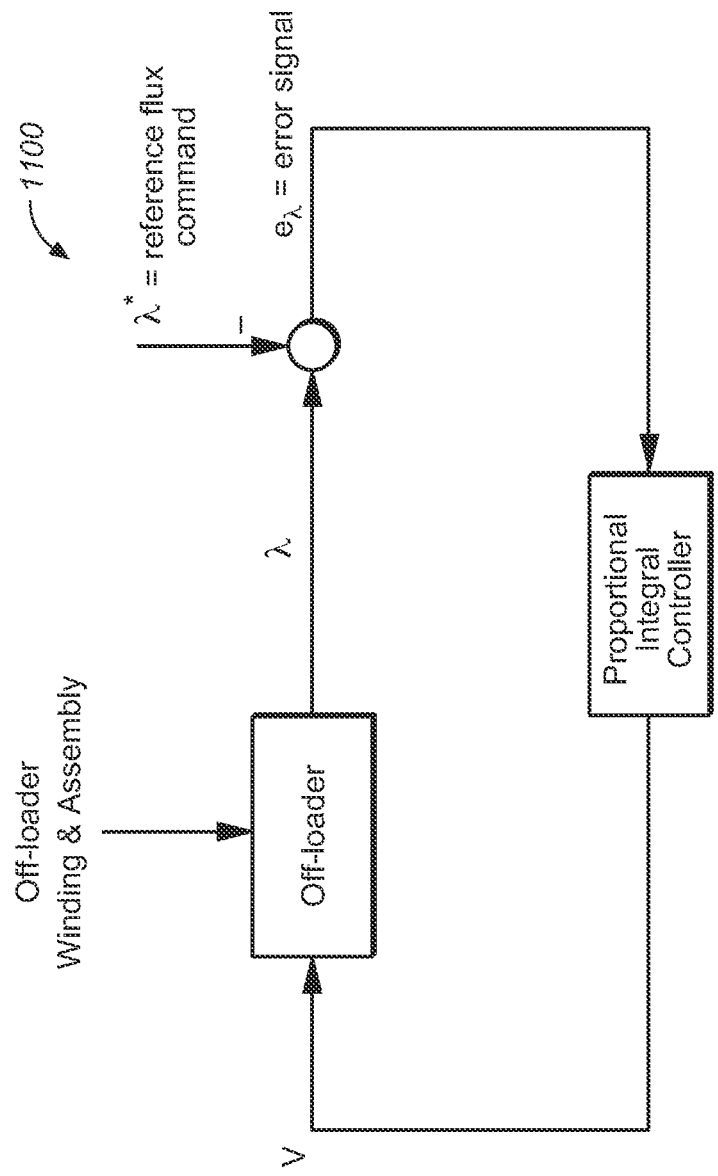
FIG. 11 is a control system diagram illustrating a second embodiment of a control algorithm of the present invention.

The derived reference value of current $I_2$ may be used directly by control system 160 to drive current I, providing the desired unloading force. Or, an alternative controller based on magnetic flux may be used to accurately control force as illustrated in control system diagram of FIG. 11, which shows a second embodiment of a control algorithm 1100.

Control algorithm 1100 illustrates the use of winding voltage 171 as input to control system 160, adjusting the voltage up when flux is below the reference value, and vice versa. This control can be conveniently implemented with either an analog or digital proportional-integral (P-I) controller. The current I may be measured for use in overcurrent protection circuitry, and may also be used as an auxiliary variable for use in the controller. However, direct control of current as an input, or as an output is not needed, since magnetic flux is used as the principle physical control variable.

Alternative Magnet Embodiments

In alternative embodiments, any of the flywheel apparatus described above may have a magnet 170 that is a hybrid magnet including both an electromagnet and a permanent magnet.

FIG. 12 is a schematic cross-sectional of a flywheel apparatus 1200 of the present invention having a second embodiment magnet 1270. Flywheel apparatus 1200 is generally similar to any of the flywheel apparatus described above. Magnet 1270 includes magnet 170, which is an electromagnet, and a permanent magnet 1201. In this embodiment, magnet 1201 is an axially magnetized ring magnet, and may be one magnet, or could be several smaller arc magnets. Magnets 170 and 1201 are arranged to have shared flux paths.

In flywheel apparatus 1200, rotor 920 is lifted by the combination of magnets 170 and 1201. This combination reduces the amount of lifting current required by magnet 170, and thus the windings of the electromagnet of magnet 770 may be proportionally smaller than those of flywheel apparatus 100, and/or the winding power requirements may be reduced.

FIG. 13 is a schematic cross-sectional of a flywheel apparatus 1300 of the present invention having a third embodiment magnet 1370. Flywheel apparatus 1300 is generally similar to any of the flywheel apparatus described above. Magnet 1370 includes magnet 170, which is an electromagnet, and a permanent magnet 1301. In this embodiment, magnet 1301 is an axially magnetized, axisymmetric ring magnet that is configured to be in series with the flux path of magnet 170.

As in flywheel apparatus 1200, rotor 920 of flywheel apparatus 1300 is lifted by the combination of and electromagnet and permanent magnet, and thus the windings of the electromagnet of magnet 1370 may be proportionally smaller than those of flywheel apparatus 100.

One embodiment of each of the methods described herein is in the form of a computer program that executes on a processing system, e.g., a one or more processors that are part of a control system. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A method of operating a flywheel assembly, where the flywheel assembly includes a rotor having a vertical axis of rotation and a magnetic material, a bearing assembly connected to a housing, and a magnet positioned to levitate the rotor in the housing, where the bearing assembly restricts axial motion of the rotor between a lower position and an upper position, wherein a gap between the magnet and the rotor when the rotor is in the lower position is greater than the gap between the magnet and the rotor when the rotor is in the upper position, the bearing assembly including a bearing and a stop connected to the housing, wherein the rotor is in the upper position when the bearing is in contact with the stop, said method comprising:
while the rotor is rotating about the vertical axis of rotation, thereby storing energy:
responsive to a non-rotating portion of the bearing not being in contact with the stop, providing an upper critical current to the magnet sufficient to lift the rotor from the lower position to the upper position to cause the bearing to be in contact with the stop; and
responsive to the non-rotating porting portion of the bearing being in contact with the stop, providing a lower critical current to the magnet sufficient to maintain the bearing in contact with the stop, where said upper critical current is equal to or greater than the lower critical current.

2. The method of claim 1, further comprising:
determining the lower critical current by levitating the rotor to the upper position and then decreasing the current until said rotor returns to said lower position.

3. The method of claim 1, where said upper critical current and said lower critical current are predetermined, and where said method further includes:
controlling the current to the magnet using open loop control.

4. The method of claim 1, further comprising:
measuring a force or displacement of the rotor; and
controlling the current to the magnet using feedback from the measurement.

5. The method of claim 1, further comprising:
measuring a magnetic or electric property of the magnet; and
controlling the current to the magnet using feedback from the measurement.

6. A method of operating a flywheel assembly, where the flywheel assembly includes a rotor having a vertical axis of rotation and a magnetic material, a bearing assembly connected to a housing, and a magnet positioned to levitate the rotor in the housing, where the bearing assembly restricts axial motion of the rotor between a lower position and an upper position, wherein a gap between the magnet and the rotor when the rotor is in the lower position is greater than the gap between the magnet and the rotor when the rotor is in the upper position, the bearing assembly including a bearing and a stop connected to the housing, wherein the rotor is in the upper position when the bearing is in contact with the stop, and wherein a current applied to the magnet greater than an upper critical current is sufficient to lift the rotor from the lower position to the upper position, and where a current applied to the magnet greater than a lower critical current is sufficient to maintain the rotor at the upper position, said method comprising:
while the rotor is rotating about the vertical axis of rotation, thereby storing energy:
with a non-rotating portion of the bearing not being in contact with the stop, increasing a current to the magnet to the upper critical current sufficient to levitate the rotor from the lower position to or near the upper position;
with the non-rotating portion of the bearing being in contact with the stop, reducing the current to the magnet to the lower critical current; and
operating said rotor with a current to the magnet equal to or greater than the lower critical current.

7. The method of claim 6, further comprising, determining the lower critical current by, with said rotor at or near said upper position, decreasing the current until said rotor returns to said lower position.

8. The method of claim 6, where the upper critical current and the lower critical current are predetermined and where said operating includes open loop controlling of the current.

9. The method of claim 6, where said operating includes measuring a force on or displacement of the rotor, and where said operating includes using the measurement in a closed loop control of the current to the magnet.

10. The method of claim 6, where said operating includes measuring an electrical or magnetic property of the magnet, and where said operating includes using the measurement in a closed loop control of the current to the magnet.

11. The method of claim 10, where said measuring includes measuring the magnet inductance from a measurement of a magnetic flux and a measurement of the current in the magnet winding.

12. The method of claim 10, where said measuring includes determining the magnet inductance from measurements of applied voltage and current in the magnet winding.

13. A flywheel apparatus comprising:
- a housing;
- a rotor having a rotor weight and an axis of rotation aligned with gravity, where said rotor includes a magnetic material;
- a magnet positioned to apply an attractive force on the magnetic material in a direction along said axis of rotation and counter the force of gravity;
- a bearing assembly, where said bearing assembly restricts axial motion of the rotor between a lower position having a maximum gap between the rotor and magnet, and an upper position having a minimum gap between the rotor and the magnet, the bearing assembly including:
  - a bearing coupling said housing and said rotor, where said bearing permits rotation of the rotor about the axis of rotation, and
  - a stop connected to the housing, wherein, while the rotor is rotating about the vertical axis of rotation, thereby storing energy: the rotor is in the upper position when a non-rotating portion of the bearing is in contact with the stop, and
  - the non-rotating portion of the bearing is not in contact with the stop when the rotor is in the lower position;
- one or more sensors adapted to measure at least one from the group consisting of the magnetic flux between said magnet and said rotor, a position of said rotor, and a force on said rotor; and
- a control system adapted to provide current to said magnet in response to the measurements of the one or more sensors, wherein responsive to the non-rotating portion of the bearing not being in contact with the stop, said current is an upper critical current sufficient to lift the rotor from the lower position to the upper position to cause the bearing to be in contact with the stop, and wherein responsive to the non-rotating portion of the bearing being in contact with the stop, said current is a lower critical current sufficient to maintain the bearing in contact with the stop, where said upper critical current is equal to or greater than said lower critical current.

14. The flywheel apparatus of claim 13, wherein said magnet includes a permanent magnet.

15. The flywheel apparatus of claim 13, wherein the bearing assembly permits axial movement of said bearing to less than a maximum rotor elevation.

16. The method of claim 1, wherein the non-rotating portion of the bearing comprises an upper surface and a lower surface, and the lower critical current is provided to the magnet responsive to the upper surface of the non-rotating portion of the bearing being in contact with the stop.

17. The method of claim 1, wherein the flywheel assembly further includes a lower bearing assembly including a second bearing and a second stop, and wherein the rotor is in the lower position when a lower surface of a non-rotating portion of the second bearing is in contact with the second stop.

18. The method of claim 6, wherein the non-rotating portion of the bearing comprises an upper surface and a lower surface, and the current is reduced to the lower critical current responsive to the upper surface of the non-rotating portion of the bearing being in contact with the stop.

19. The method of claim 6, wherein the flywheel assembly further includes a lower bearing assembly including a second bearing and a second stop, and wherein the rotor is in the lower position when a lower surface of a non-rotating portion of the second bearing is in contact with the second stop.

20. The flywheel apparatus of claim 13, wherein the rotor is in the upper position when an upper surface of the non-rotating portion of the bearing is in contact with the stop.

21. The flywheel apparatus of claim 13, further comprising:
- a lower bearing assembly including:
  - a second bearing coupling said housing and said rotor, where said second bearing permits rotation of the rotor about the axis of rotation, and
  - a second stop connected to the housing, wherein the rotor is in the lower position when a lower surface of a non-rotating portion of the second bearing is in contact with the stop.

22. A method of operating a flywheel assembly, where the flywheel assembly includes a rotor having a vertical axis of rotation and a magnetic material, an upper bearing assembly and a lower bearing assembly connected to a housing, and a magnet positioned to levitate the rotor in the housing, where the upper bearing assembly and the lower bearing assembly restrict axial motion of the rotor between a lower position and an upper position, wherein a gap between the magnet and the rotor when the rotor is in the lower position is greater than the gap between the magnet and the rotor when the rotor is in the upper position, the upper bearing assembly including an upper bearing and an upper stop connected to an upper portion of the housing, the lower bearing assembly including a lower bearing and a lower stop connected to a lower portion of the housing, wherein the upper and lower bearings are movable with respect to the upper and lower stops, wherein the rotor is in the upper position when the upper bearing is in contact with the upper stop, said method comprising:
- responsive to the upper bearing not being in contact with the upper stop, providing an upper critical current to the magnet sufficient to lift the rotor from the lower position to the upper position to cause the upper bearing to be in contact with the upper stop; and
- responsive to a non-rotating portion of the upper bearing being in contact with the upper stop, providing a lower critical current to the magnet sufficient to maintain the upper bearing in contact with the upper stop, where said upper critical current is equal to or greater than the lower critical current.

* * * * *

UNITED STATES PATENT AND TRADEMARK OFFICE
CERTIFICATE OF CORRECTION

PATENT NO. : 9,892,839 B2
APPLICATION NO. : 13/973937
DATED : February 13, 2018
INVENTOR(S) : Seth R. Sanders Page 1 of 1

It is certified that error appears in the above-identified patent and that said Letters Patent is hereby corrected as shown below:

Assignee item (73): "Amber Kinetics, Inc., Union City, CA (US)" to read as -- Amber Kinetics, Inc., Fremont, CA (US) --

Column 13, Line 62: "responsive to the non-rotating porting portion of the" to read as -- responsive to the non-rotating portion of the --

Signed and Sealed this
Twenty-fifth Day of September, 2018

Andrei Iancu
*Director of the United States Patent and Trademark Office*